United States Patent
Hayami et al.

(10) Patent No.: US 11,408,579 B2
(45) Date of Patent: Aug. 9, 2022

(54) AUTOMOTIVE LAMP AND CONTROL METHOD FOR DMD

(71) Applicant: Koito Manufacturing Co., Ltd., Tokyo (JP)

(72) Inventors: Toshihisa Hayami, Shizuoka (JP); Yuki Usuda, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/330,843

(22) Filed: May 26, 2021

(65) Prior Publication Data

US 2021/0278057 A1 Sep. 9, 2021

Related U.S. Application Data

(63) Continuation of application No. PCT/JP2019/045096, filed on Nov. 18, 2019.

(30) Foreign Application Priority Data

Nov. 28, 2018 (JP) .............................. JP2018-222593

(51) Int. Cl.
*F21S 41/675* (2018.01)
*F21W 102/13* (2018.01)

(52) U.S. Cl.
CPC ........ *F21S 41/675* (2018.01); *F21W 2102/13* (2018.01)

(58) Field of Classification Search
CPC ................. F21W 2102/13; F21S 41/675
See application file for complete search history.

(56) References Cited

U.S. PATENT DOCUMENTS

| | | | |
|---|---|---|---|
| 9,658,447 B2 * | 5/2017 | Bhakta | ................ F21S 41/16 |
| 2008/0055708 A1 | 3/2008 | Douglass et al. | |
| 2015/0160454 A1 | 6/2015 | Bhakta | |
| 2015/0194100 A1 | 7/2015 | Hada | |

(Continued)

FOREIGN PATENT DOCUMENTS

| | | |
|---|---|---|
| EP | 2772682 A2 | 9/2014 |
| EP | 2821987 A1 | 1/2015 |
| JP | 2016091976 A | 5/2016 |

(Continued)

OTHER PUBLICATIONS

International Preliminary Report on Patentability (PCT/IPEA/409) with translation and Written Opinion (PCT/ISA/237) issued in corresponding International Patent Application No. PCT/JP2019/045096 dated May 25, 2021. (14 pages).

(Continued)

*Primary Examiner* — Robert J May
(74) *Attorney, Agent, or Firm* — Buchanan Ingersoll & Rooney PC

(57) ABSTRACT

An illumination apparatus generates illumination light. A patterning device includes a digital micromirror device (DMD) configured to spatially modulate and reflect the illumination light according to a pattern signal. A DMD controller generates the pattern signal. The DMD controller generates a refresh pattern signal for repeatedly turning on and off micromirrors in a period in which the DMD is set to the enable state and the illumination light is turned off.

10 Claims, 10 Drawing Sheets

(56) References Cited

U.S. PATENT DOCUMENTS

2018/0246324 A1 8/2018 Hada et al.
2019/0120454 A1* 4/2019 Mouri .................... F21S 41/25

FOREIGN PATENT DOCUMENTS

WO 2014007016 A1 1/2014
WO 2017057001 A1 4/2017

OTHER PUBLICATIONS

International Search Report (PCT/ISA/210) with translation dated Jan. 28, 2020, by the Japan Patent Office as the International Searching Authority for International Application No. PCT/JP2019/045096. (6 pages).
Extended European Search Report dated Dec. 16, 2021, issued in corresponding European Application No. 19889043.6. (12 pages).

* cited by examiner

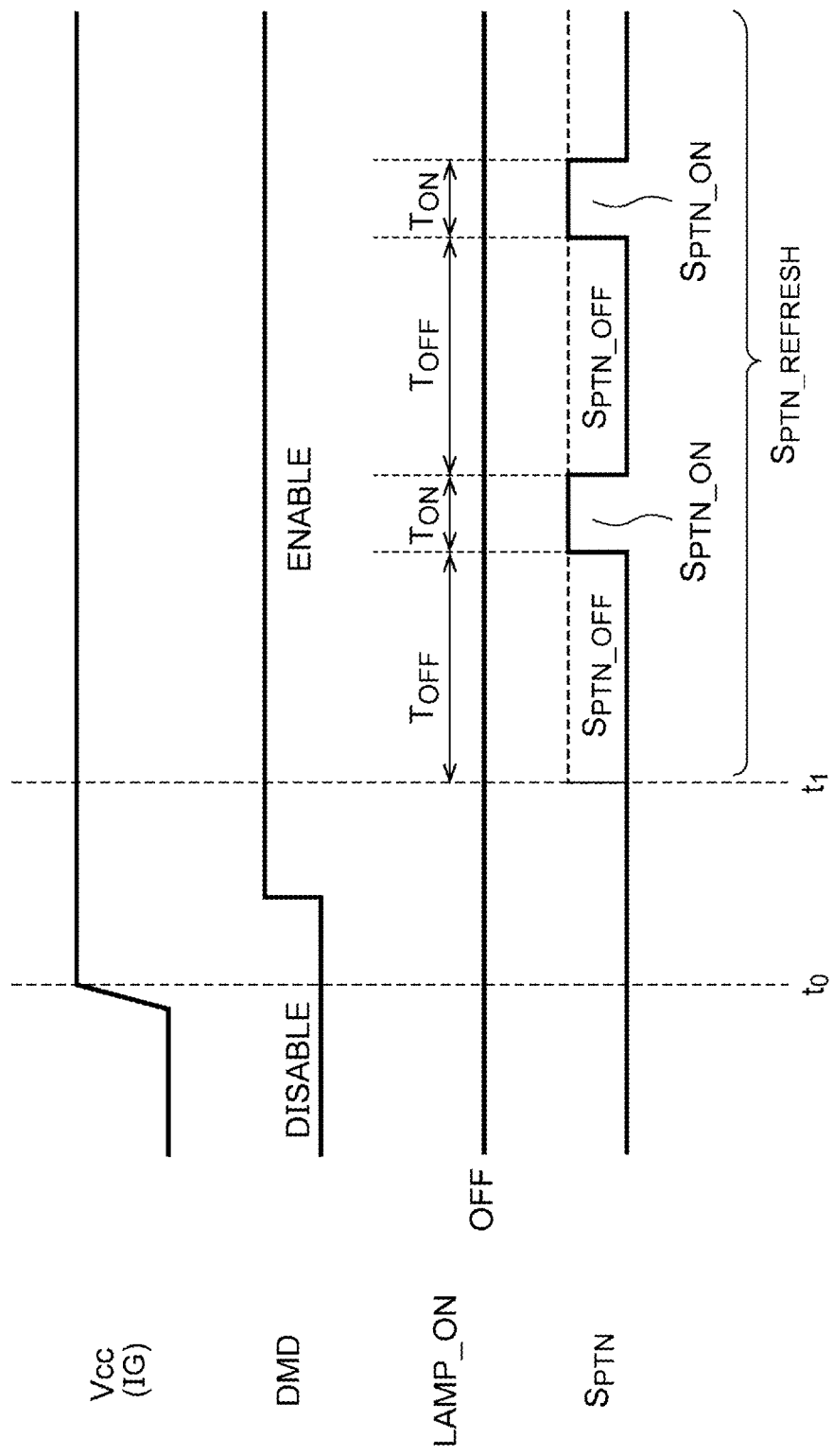

AUTOMOTIVE LAMP AND CONTROL METHOD FOR DMD

BACKGROUND

1. Technical Field

The present disclosure relates to an automotive lamp.

2. Description of the Related Art

As a spatial modulator that provides spatial patterning of light, a Digital Micromirror Device (DMD) is known. A DMD provides high resolution, and enables high-speed pattern switching. Accordingly, DMDs are being considered for application to an automotive lamp such as an Adaptive Driving Beam (ADB) system that adaptively switches a light distribution according to a traveling situation, a road drawing system that draws a pattern on a road surface for driving assistance, etc.

FIGS. 1A through 1C are diagrams each showing a structure of a DMD. As shown in FIG. 1A, a DMD 100 includes an array 102 of movable micromirrors 104 arranged in a matrix manner. The micromirrors 104 each correspond to a corresponding pixel. As shown in FIG. 1B, each micromirror 104 is rotatably supported by means of a hinge 106. By switching the tilting angle of each micromirror 104, such an arrangement allows light to be turned on and off for each pixel.

As a factor of degradation in DMD performance, hinge memory is known. Hinge memory is known as an abnormal state in which the hinge 106 that supports the micromirror 104 does not operate normally. Such hinge memory occurs due to continuation of the turn-on or turn-off state over a long period of time. In order to solve such a problem, i.e., in order to suppress hinge memory, as shown in FIG. 1C, a DMD controller supports an operation to set each micromirror 104 to a neutral (flat) position that is an intermediate position between the on-state position and the off-state position during a period in which the power supply of the DMD is turned off. After the completion of the start-up operation once the power supply of the DMD is turned on, the DMD enters a controllable state (which will be referred to as an "enable state") in which it can be controlled based on image data supplied from an external circuit. In the enable state, the position of each micromirror 104 is able to be set to only one from among the on state and the off state. That is to say, in the enable state, each micromirror 104 is not able to be set to the flat state.

As a result of investigating DMDs, the present inventors have recognized the following problem. That is to say, in particular applications such as a projector to be used indoors, each pixel is frequently repeatedly switched between the on state and the off state according to an image to be displayed. Accordingly, it can be said that hinge memory does not readily occur.

In contrast, the light distribution formed by an automotive lamp involves a situation in which there is a first region to which light is irradiated at all times and a second region that is shielded at all times. That is to say, this can lead to a situation in which each pixel that corresponds to a first portion of the DMD is set to the on state for several hours and each pixel that corresponds to a second portion of the DMD is set to the off state for several hours.

Furthermore, such an automotive lamp is required to be turned on immediately according to a turn-on instruction. A DMD requires a startup time on the order of several hundred ms to 1 s. Accordingly, in a case in which the power supply of the DMD is turned on after the reception of a turn-on instruction, such an arrangement has a problem of the occurrence of a delay before the automotive lamp is actually turned on. In order to solve the problem of the occurrence of such a delay, it is necessary to supply power to the DMD so as to set it to the enable state, thereby readying it to respond to an upcoming turn-on instruction. However, in the enable state of the DMD, each micromirror is set to a state in which it is fixedly set to the turn-off side, which causes hinge memory.

In addition, in a case in which the DMD is mounted on an automotive lamp, the DMD is arranged in the vicinity of a semiconductor light source such as an LED or the like in a narrow space in a headlamp. A semiconductor light source such as an LED or the like has a very high temperature. Accordingly, the DMD operates at a high temperature as compared with typical projectors. It has been found based on experimental results obtained by the present inventors that, when each pixel is continuously and fixedly set to the on state or the off state under an environment in which the DMD operates at a temperature that is higher than 80° C., this leads to the occurrence of hinge memory. Upon turning off the power supply of the DMD after the DMD operates under such a high-temperature environment, the controller controls the DMD so as to set each micromirror to the flat state. However, the micromirrors cannot be returned to the flat state due to the effects of the hinge memory. Accordingly, each hinge is left in a distorted state over a long period of time. As a result, such a distorted state of each hinge in the power supply off period further leads to hinge memory. This becomes a cause of degradation of image quality when the DMD is operated the next time the power is supplied.

It should be noted that such a finding is by no means within the scope of common and general knowledge of those skilled in this art.

SUMMARY

An embodiment of the present invention relates to an automotive lamp. The automotive lamp includes: an illumination apparatus structured to generate illumination light; and a patterning device including a digital micromirror device (DMD) structured to spatially modulate and reflect the illumination light according to a pattern signal. The automotive lamp is structured to execute a refresh operation in which micromirrors are repeatedly switched on and off in a period in which the DMD is enabled and the illumination light is turned off.

It should be noted that any combination of the components described above, any component of the present invention, or any manifestation thereof, may be mutually substituted between a method, apparatus, system, and so forth, which are also effective as an embodiment of the present invention.

The description of the items (means for solving the problems) is by no means intended to describe all the indispensable features of the present invention. That is to say, any sub-combination of the features as described above is also encompassed in the technical scope of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 10 is a diagram for explaining the refresh operation according to a modification 1.

DETAILED DESCRIPTION OVERVIEW OF THE EMBODIMENTS

Figure 1A:
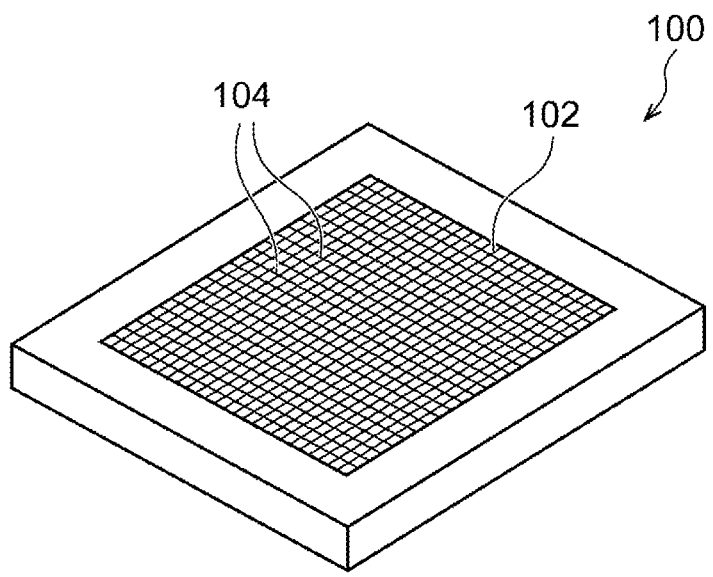
FIGS. 1A through 1C are diagrams each showing a configuration of a DMD.

An embodiment disclosed in the present disclosure relates to an automotive lamp. The automotive lamp includes: an illumination apparatus structured to generate illumination light; and a patterning device including a digital micromirror device (DMD) structured to spatially modulate and reflect the illumination light according to a pattern signal. The automotive lamp is structured to execute a refresh operation in which micromirrors in the DMD are repeatedly switched on and off in a period in which the DMD is enabled and the illumination light is turned off.

With this embodiment, the refresh operation is supported so as to forcibly tilt the micromirrors to the on side and off side, thereby solving a problem of hinge sticking. This suppresses degradation of image quality due to hinge memory.

The micromirrors may be switched between the on state and the off state with a period that is an integer multiple of the frame period.

The DMD is capable of providing multi-gradation control using pulse width modulation (PWM) control. Upon receiving the supply of an intermediate gradation value, the DMD driver switches on and off the micromirrors with a PWM frequency and with a duty ratio that corresponds to the gradation values thus supplied. Accordingly, a refresh pattern signal including such an intermediate gradation value may be generated so as to switch on and off each micromirror using the PWM control.

Also, the refresh operation may be executed in an initialization period immediately after the power supply of the automotive lamp is turned on. This arrangement is able to solve a problem of hinge memory remaining in a period in which the power supply of the DMD is turned off. Furthermore, this arrangement disables a turn-on instruction during the initialization period. This provides an advantage in that conflict between the turn-on instruction and the refresh operation does not readily occur.

Also, the refresh operation may be executed when the power supply of the automotive lamp is shut down. This arrangement is capable of solving a problem of hinge memory that occurs in the operation of the DMD. This allows the power supply of the DMD to be turned off while setting the micromirrors to the flat state. Furthermore, such an arrangement has no potential to generate a turn-on instruction in the shutdown period. This provides an advantage in that conflict between the turn-on instruction and the refresh operation does not readily occur.

The automotive lamp may execute the refresh operation in a period in which the illumination light is turned off after the completion of the startup sequence.

Also, the illumination apparatus and the patterning device may form a high-beam lamp. Also, the automotive lamp may further include a low-beam lamp. Also, the refresh operation may be executed in a state in which the low-beam lamp is turned on and the high-beam lamp is turned off. In a state in which the turn-on period of the low-beam lamp continues, the temperature of the DMD rises due to heat generation. In this state, the micromirrors of the DMD are maintained in the off state, which causes hinge memory. In order to solve such a problem, the refresh pattern signal is generated in the turn-on period of the low-beam lamp, thereby solving a problem of hinge memory.

Also, when the temperature of the DMD exceeds a predetermined value, the refresh operation may be executed. Hinge memory does not readily occur in a low-temperature state. Accordingly, the temperature is preferably employed as a trigger for generating the refresh pattern signal.

Also, the frequency of the refresh operation may be increased according to an increase in the temperature of the DMD. This arrangement is capable of effectively suppressing the occurrence of hinge memory.

Embodiments

Description will be made below regarding the present disclosure based on preferred embodiments with reference to the drawings. The same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

In the present specification, the state represented by the phrase "the member A is coupled to the member B" includes a state in which the member A is indirectly coupled to the member B via another member that does not substantially affect the electric connection between them, or that does not damage the functions or effects of the connection between them, in addition to a state in which they are physically and directly coupled.

Similarly, the state represented by the phrase "the member C is provided between the member A and the member B" includes a state in which the member A is indirectly coupled to the member C, or the member B is indirectly coupled to the member C via another member that does not substantially affect the electric connection between them, or that does not damage the functions or effects of the connection between them, in addition to a state in which they are directly coupled.

In the present specification, the vertical axis and the horizontal axis shown in the waveform diagrams and the time charts in the present specification are expanded or reduced as appropriate for ease of understanding. Also, each waveform shown in the drawing is simplified or exaggerated for emphasis for ease of understanding.

Figure 2:
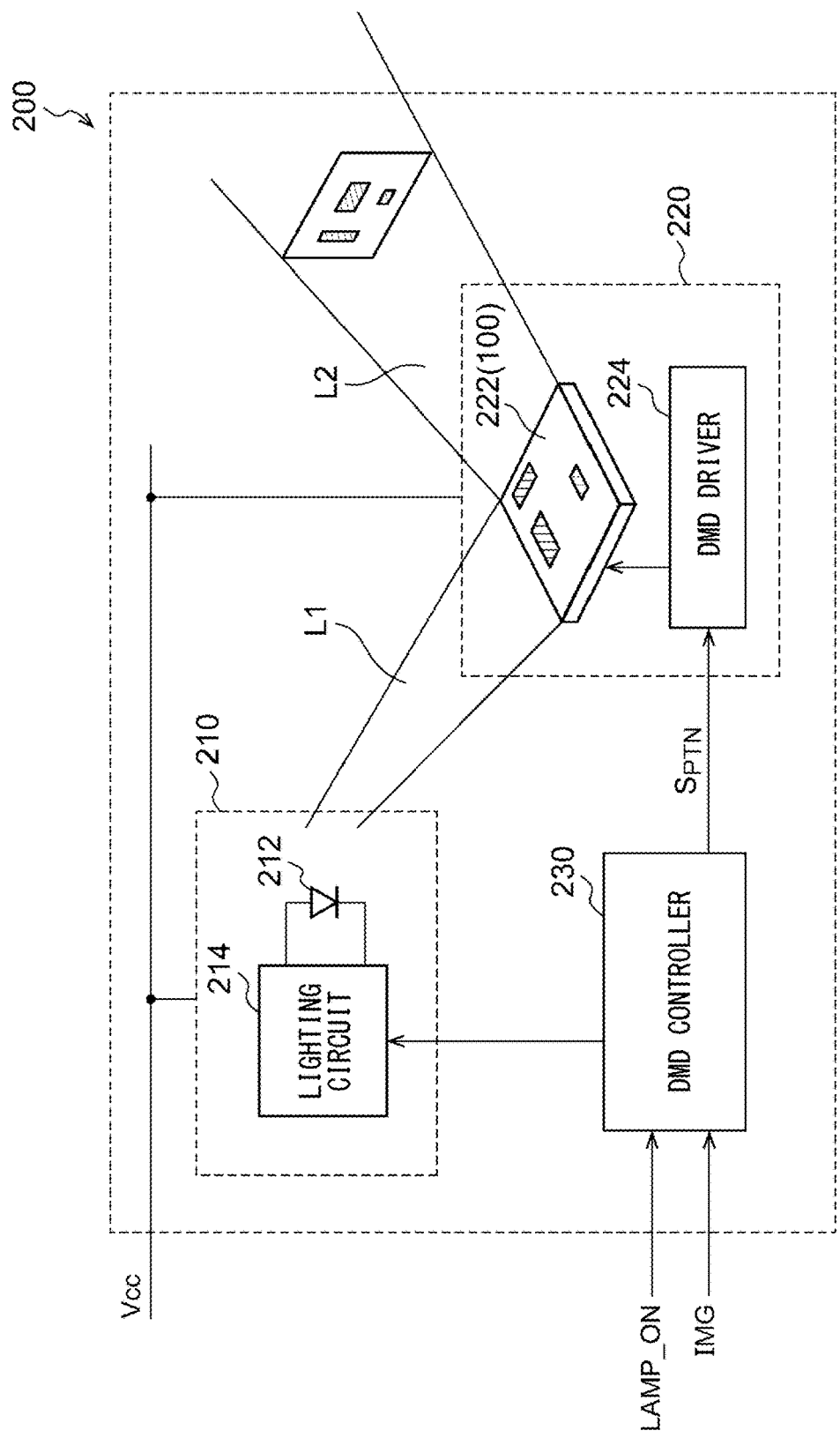
FIG. 2 is a block diagram showing an automotive lamp according to an embodiment.

FIG. 2 is a block diagram showing an automotive lamp according to an embodiment. An automotive lamp 200 includes an illumination apparatus 210, a patterning device 220, and a DMD controller 230. The illumination apparatus 210, the patterning device 220, and the DMD controller 230 may be configured as a single module which may also be referred to as a DMD unit.

In the present embodiment, the automotive lamp 200 is configured as a headlamp having an ADB function. The automotive lamp 200 dynamically and adaptively changes the light distribution according to the traveling environment (presence or absence of a leading vehicle, oncoming vehicle, or pedestrian, the time of day, vehicle speed, steering angle, driving situation, etc.).

The illumination apparatus 210 generates illumination light L1 having a uniform cross-sectional light intensity distribution. For example, the illumination apparatus 210 includes a light source 212 and a lighting circuit 214. The lighting circuit 214 generates a driving current $I_{OUT}$ stabilized to an amount of current that corresponds to the target luminance of the light source 212, and supplies the driving current $I_{OUT}$ to the light source 212. The light source 212 is configured as a laser diode (LD), a light-emitting diode (LED), an organic electro-luminescence (EL) element, or the like, for example. The light source 212 emits light with a luminance that corresponds to the driving current $I_{OUT}$.

The patterning device 220 includes a DMD 222 (100) configured to spatially modulate the illumination light L1 according to a pattern signal $S_{PTN}$ and to reflect light, and a DMD driver 224. As described above, the DMD 222 includes multiple pixels arranged in a matrix, i.e., an array of micromirrors. The micromirrors are individually on/off controlled for each pixel by the DMD driver 224. The DMD driver 224 receives the pattern signal (i.e., image data) $S_{PTN}$ at a predetermined frame rate. The DMD driver 224 controls the DMD 222 for each of the multiple micromirrors according to the pattern signal $S_{PTN}$. The patterning device 220 provides reflected light L2, which provides a dark region that corresponds to the off-state pixels and a bright region that corresponds to the on-state pixels.

That is to say, a part of the illumination light L1 input to the patterning device 220 and input to the on-state mirrors from among the multiple micromirrors is reflected toward the front side from the automotive lamp 200. Furthermore, another part of the illumination light L1 input to the off-state mirrors is reflected in a direction that differs from the forward direction of the automotive lamp such that it is blocked or absorbed. With such an arrangement, a desired light distribution pattern can be formed according to a combination of the on/off states of the multiple micromirrors.

The pattern signal $S_{PTN}$ may be configured as multi-gradation (e.g., 8-bit) image data. Each micromirror is instantaneously settable to one from among two states, i.e., the on state and the off state. Accordingly, each micromirror is instantaneously set to a reflection ratio of 0% or 100%. The DMD driver 224 executes a PWM dimming control operation so as to change the ratio between the on-state period and the off-state period in each frame period so as to obtain intermediate gradations. With this, the average value of the reflection ratio generated over each frame is controlled.

The DMD controller 230 generates a suitable pattern signal (which will be referred to as a light distribution pattern signal) $S_{PTN\_DIST}$ according to the traveling environment. The light distribution pattern signal $S_{PTN\_DIST}$ is changed with time according to the traveling environment. Alternatively, in some cases, the light distribution pattern signal $S_{PTN\_DIST}$ is fixed depending on the traveling environment. The reflected light L2 of the DMD 100 is spatially modulated according to the light distribution pattern signal $S_{PTN\_DIST}$.

In the present embodiment, the automotive lamp 200 uses the power supply voltage $V_{CC}$ configured as a shared voltage. For example, the power supply voltage $V_{CC}$ is configured as an ignition (IG) power supply voltage. Furthermore, the automotive lamp 200 receives the input of a control signal (LAMP_ON) which is an instruction to turn on or off the automotive lamp 200. For example, the LAMP_ON signal may be configured as a binary signal with the high state associated with a turn-on instruction and the low state associated with a turn-off instruction.

In addition to the LAMP_ON signal, the DMD controller 230 may receive the supply of image data IMG that defines the light distribution pattern signal $S_{PTN\_DIST}$. That is to say, the light distribution is controlled by the vehicle side.

Alternatively, the automotive lamp 200 may autonomously control the light distribution pattern. In this case, the automotive lamp 200 may mount a drawing ECU. The drawing ECU receives necessary information (position of a leading vehicle, oncoming vehicle, or pedestrian, time of day, vehicle speed, steering angle, traveling situation, etc.) that allows the vehicle side to determine the light distribution pattern. Also, the drawing ECU may generate the image data IMG based on the information thus received, and may supply the image data IMG to the DMD controller 230. The functions of the drawing ECU and the DMD controller 230 may be integrated on a single microcontroller or processor.

Upon turning on the power supply of the automotive lamp 200, each block of the automotive lamp 200 is initialized. It should be noted that, during a period in which the power supply is turned off, the patterning device 220 is maintained such that each micromirror of the DMD 222 is set to the flat state. After the initialization is executed, each micromirror is set to the off state. The state in which the power supply voltage $V_{CC}$ is supplied to the automotive lamp 200 will be referred to as the "startup state".

After the initialization is complete, upon receiving the LAMP_ON signal including a turn-on instruction from the vehicle side, the illumination apparatus 210 turns on. In this stage, the illumination light L1 is irradiated to the patterning device 220. The DMD controller 230 generates the light distribution pattern signal $S_{PTN\_DIST}$ so as to provide a desired light distribution.

Upon receiving the LAMP_ON signal that corresponds to a turn-off instruction from the vehicle side, the illumination apparatus 210 turns off. It should be noted that, even during such a period in which the illumination apparatus 210 is turned off, the patterning device 220 stands by in the enable state in preparation for turning on again.

As described above, in the enable state of the patterning device 220 after the automotive lamp 200 is started up, such an arrangement has the potential to involve a period in which the illumination light L1 is turned off. The DMD controller 230 uses a part of such a period to generate a refresh pattern signal $S_{PTN\_REFRESH}$ so as to repeatedly turn on and off each micromirror. The period in which the refresh pattern signal $S_{PTN\_REFRESH}$ is generated will be referred to as a "refresh period $T_{REFRESH}$".

Figure 3:
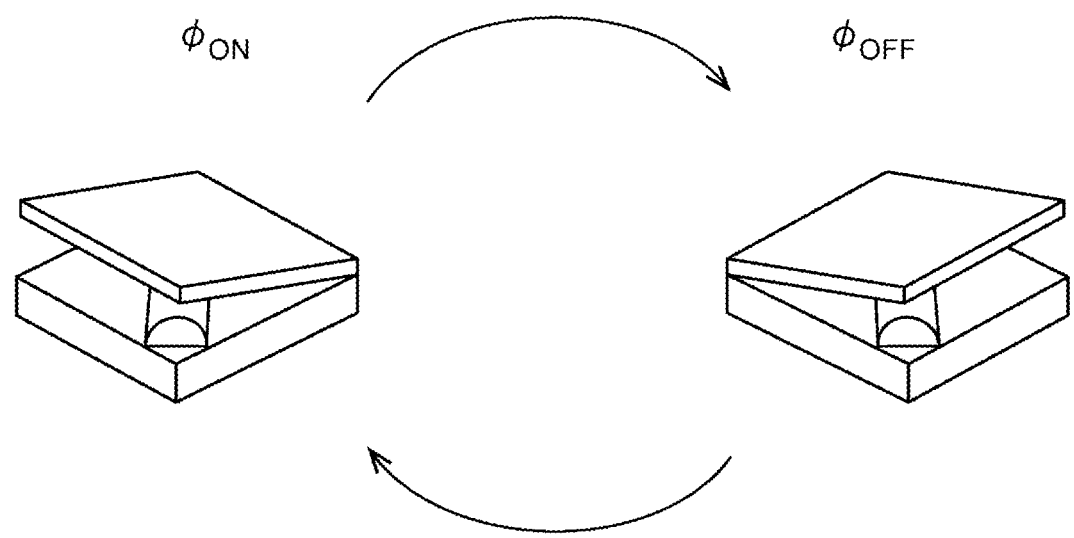
FIG. 3 is a diagram for explaining the operation of a micromirror in a refresh period $T_{REFRESH}$.

The above is the configuration of the automotive lamp 200. Next, description will be made regarding the operation thereof. FIG. 3 is a diagram for explaining the operation of each micromirror in the refresh period $T_{REFRESH}$. Although FIG. 3 shows only a single micromirror, the other micromirrors operate in the same manner. During the refresh period $T_{REFRESH}$, each micromirror alternately repeats the on state $\phi_{ON}$ and the off state $\phi_{OFF}$. The on time $T_{ON}$ and the off time $T_{OFF}$ are each preferably set to an integer multiple of the frame time of the DMD. However, the present invention is not restricted to such an arrangement. The on time $T_{ON}$ and the off time $T_{OFF}$ may each be optimized according to the kind of the DMD to be used, the manufacturer thereof, or the like.

With the automotive lamp 200, each micromirror is forcibly tilted toward the on state or the off state according to the refresh pattern signal $S_{PTN\_REFRESH}$. This arrangement is capable of eliminating hinge sticking, thereby suppressing degradation in the image quality due to hinge memory.

Figure 1B:
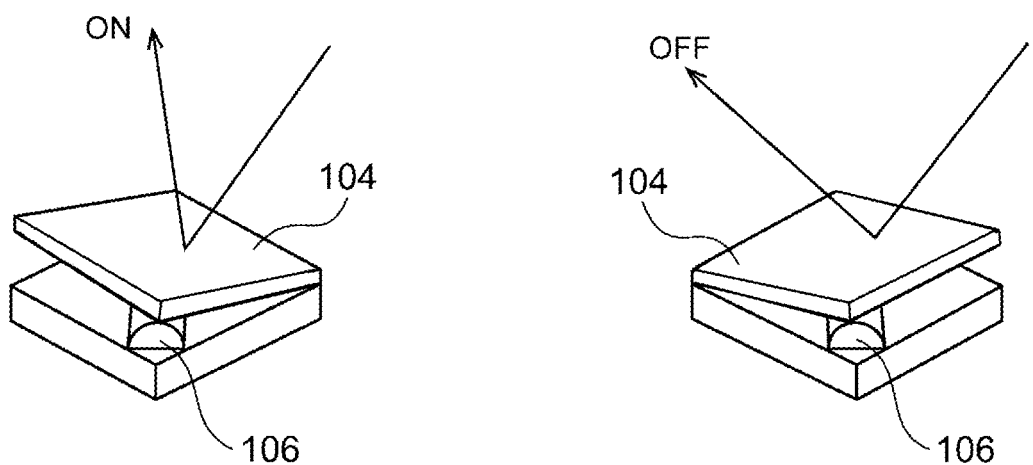
Figure 1C:
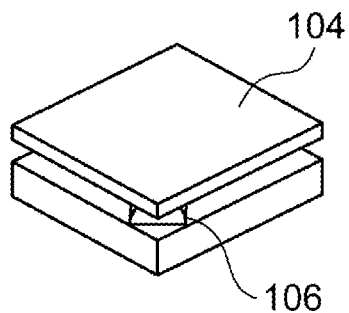

The present invention encompasses various kinds of apparatuses and methods that can be regarded as a block configuration shown in FIG. 1, or otherwise that can be derived from the aforementioned description. That is to say, the present invention is not restricted to a specific configuration. More specific description will be made below regarding an example configuration or an example for clarification and ease of understanding of the essence of the present invention and the operation thereof. That is to say, the following description will by no means be intended to restrict the technical scope of the present invention.

Figure 4A:
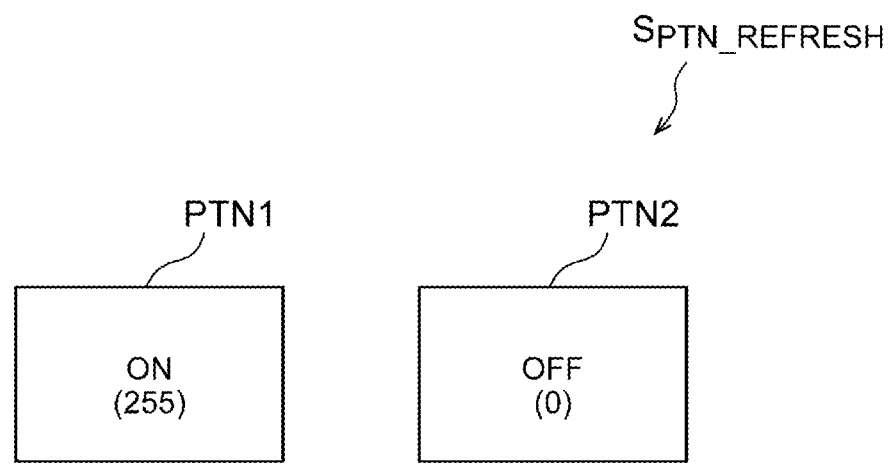
FIGS. 4A and 4B are diagrams each showing a refresh pattern signal $S_{PTN\_REFRESH}$.
Figure 4B:
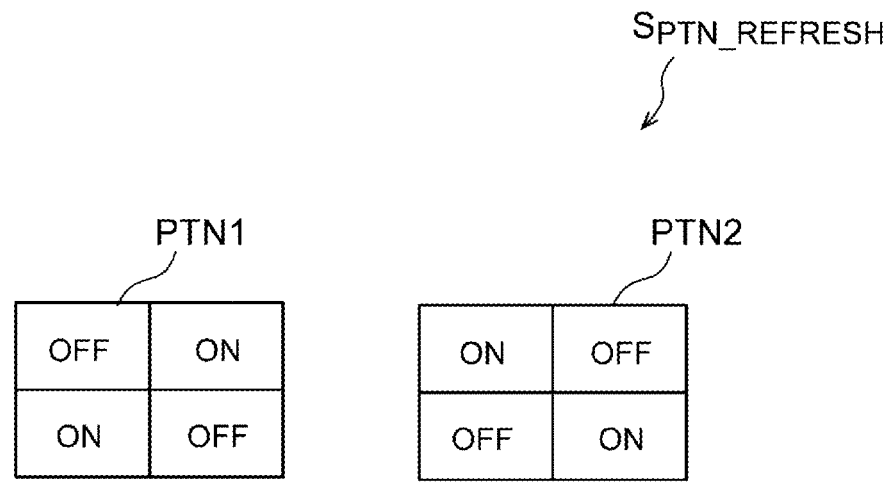

FIGS. 4A and 4B are diagrams each showing an example of the refresh pattern signal $S_{PTN\_REFRESH}$. As shown in FIG. 4A, the refresh pattern signal $S_{PTN\_REFRESH}$ may include two or more different patterns (frames). Specifically, one of the patterns, i.e., a pattern PTN1, is defined such that all the pixels are each set to the on state (maximum gradations, i.e., 255 in a case of employing an 8-bit signal). The other pattern PTN2 is defined such that all the pixels are each set to the off state (minimum gradations, i.e., 0).

As shown in FIG. 4B, each frame may be divided into multiple regions (four regions in this example). Furthermore, the two patterns PTN1 and PTN2 may be designed such that there is an inverted on/off relation between the corresponding regions thereof. The number of such regions is not restricted in particular. FIG. 4B shows an example in which each frame is divided into two rows and two columns. However, the division is not restricted in particular. Rather, each frame may be divided into M rows and N columns (M and N each represents a desired integer).

Description has been made with reference to FIGS. 4A and 4B regarding an example in which the refresh pattern signal is designed to be set to the maximum gradations and the minimum gradations. However, the present invention is not restricted to such an example. Also, the refresh pattern signal may be set to gradations that are close to the maximum gradations and a non-zero value that is close to the minimum gradations.

Figure 5A:
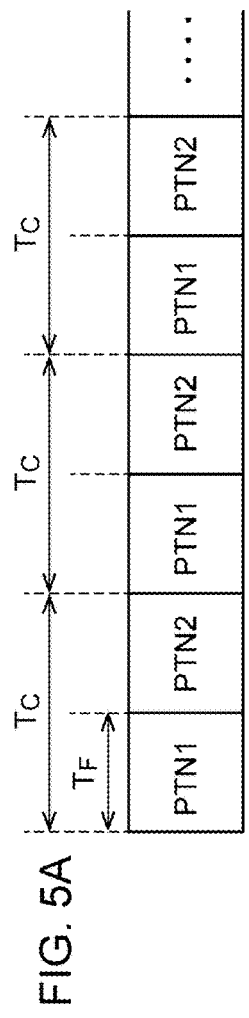
FIGS. 5A through 5D are time charts showing several examples of the refresh pattern signal $S_{PTN\_REFRESH}$.

FIGS. 5A through 5D are time charts showing several examples of the refresh pattern signal $S_{PTN\_REFRESH}$. FIG. 5A shows an example in which the refresh pattern signal $S_{PTN\_REFRESH}$ is alternately switched between the two patterns PTN1 and PTN2 for every frame period $T_F$. That is to say, the control period $T_C$ is represented by $2 \times T_F$.

Figure 5B:
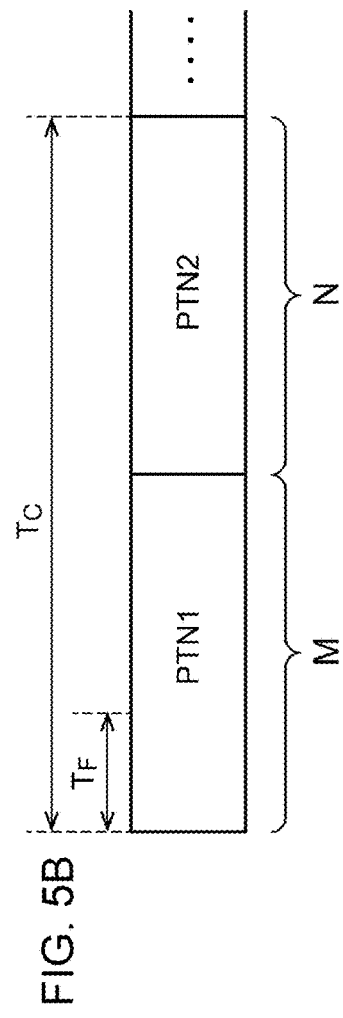

FIG. 5B shows an example in which the pattern PTN1 is selected during a period of M (M=3, in this example) multiple consecutive frames, and the pattern PTN2 is selected during a period of N (N=3, in this example) subsequent frames. In this case, the control period $T_C$ is represented by $(M+N) \times T_F$.

Figure 5C:
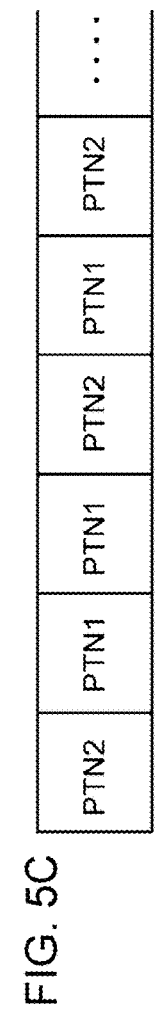

As shown in FIG. 5C, one from among the two patterns PTN1 and PTN2 may be selected at random for every frame.

Figure 5D:
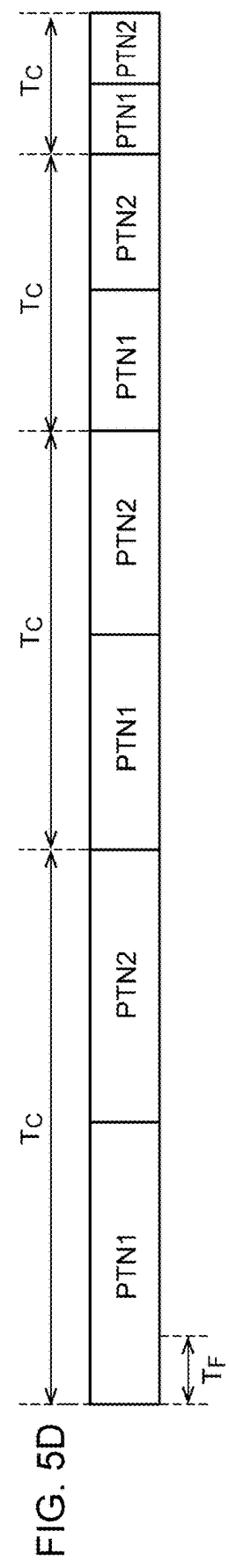

As shown in FIG. 5D, the control period $T_C$ may be changed with time. FIG. 5D shows an example in which the control period $T_C$ is reduced with time. Accordingly, the on time and the off time are each reduced with time for each pixel. Conversely, the control period may be increased with time.

Next, description will be made regarding several examples with respect to the refresh period $T_{REFRESH}$.

Figure 6:
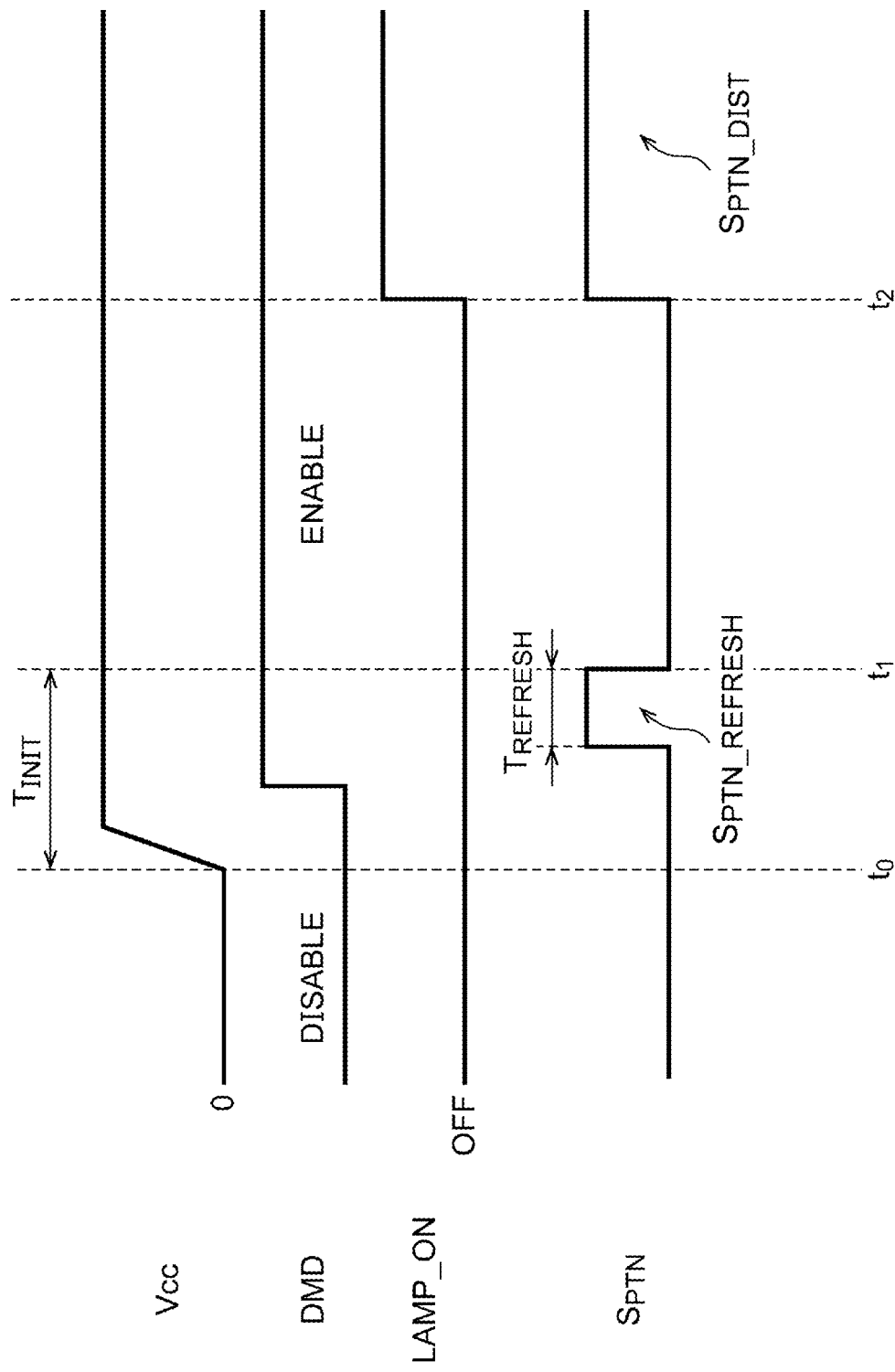
FIG. 6 is a diagram for explaining the refresh operation according to an example 1.

FIG. 6 is a diagram for explaining the refresh operation according to an example 1. In the example 1, the DMD controller 230 sets a refresh period $T_{REFRESH}$ in the initialization period immediately after the power supply of the automotive lamp 200 is turned on. Specifically, the DMD controller 230 outputs a refresh pattern signal $S_{PTN\_REFRESH}$.

When the power supply voltage $V_{CC}$ is supplied at the time point $t_0$, each circuit block of the automotive lamp 200 is started up. In this stage, a predetermined initialization sequence is executed. The period until the completion of the initialization sequence will be referred to as an "initialization period $T_{INIT}$". During the initialization period $T_{INIT}$, the turn-on instruction is prohibited. For example, after the completion of the initialization sequence at the time point $t_1$, the automotive lamp 200 may transmit a flag indicating the completion of the initialization sequence to the in-vehicle electronic control unit (ECU).

In other words, such an arrangement ensures that no turn-on instruction is input in the form of the LAMP_ON signal during the initialization period $T_{INIT}$. Accordingly, by setting the refresh period $T_{REFRESH}$ in the initialization period $T_{INIT}$ after the DMD is set to the enable state after the completion of the start-up operation of the DMD, this arrangement is capable of eliminating hinge memory.

When the turn-on instruction (LAMP_ON=HI) is input at the time point $t_2$, the illumination apparatus 210 irradiates the illumination light L1 to the patterning device 220. Furthermore, the DMD controller 230 supplies the light distribution pattern signal $S_{PTN\_DIST}$ to the patterning device 220 so as to control the light distribution.

Such a control operation has an advantage of preventing conflict between the turn-on instruction and the refresh operation.

Figure 7:
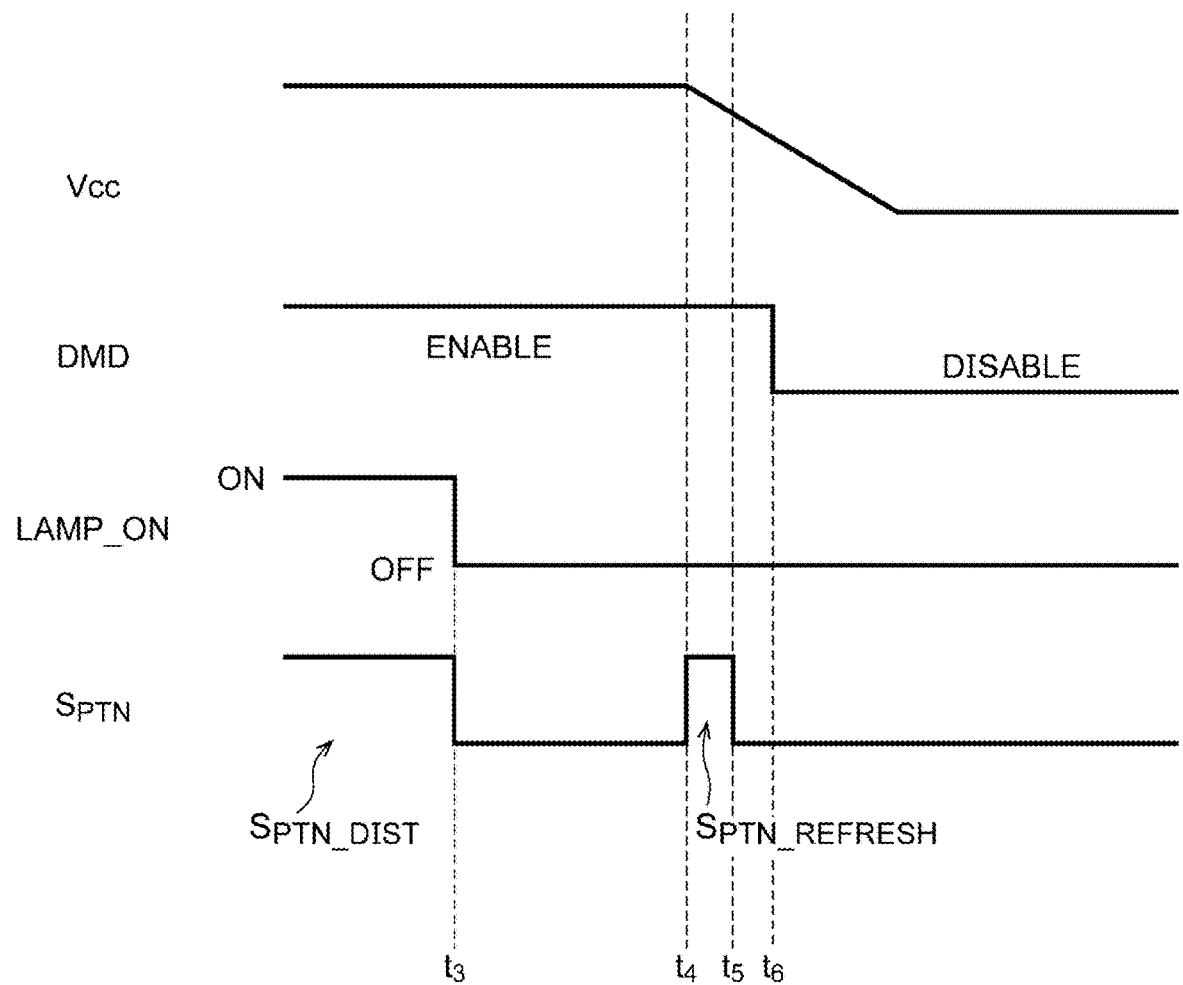
FIG. 7 is a diagram for explaining the refresh operation according to an example 2.

FIG. 7 is a diagram for explaining the refresh operation according to an example 2. In the example 2, the DMD controller 230 sets the refresh period $T_{REFRESH}$ in a shutdown period in which the power supply of the automotive lamp 200 is turned off. In the refresh period $T_{REFRESH}$, the DMD controller 230 outputs the refresh pattern signal $S_{PTN\_REFRESH}$.

At the time point $t_3$, the LAMP_ON signal is set to the low state, which is an instruction to turn off the lamp. With this, the illumination apparatus 210 turns off the illumination light L1. When the power supply voltage $V_{CC}$ is turned off at the time point $t_4$, the automotive lamp 200 executes a shutdown sequence.

In the shutdown period, before the power supply of the DMD is turned off, i.e., in a period in which DMD is set to the enable state, the refresh period $T_{REFRESH}$ is inserted so as to eliminate hinge memory. Subsequently, the power supply of the DMD is turned off so as to set the DMD to the disable state. After the completion of the refresh period $T_{REFRESH}$ at the time point $t_5$, a DMD stop sequence is executed. As a result, the DMD is set to the disable state at the time point $t_6$. After the time point $t_6$, each micromirror is set to the flat state.

Figure 8:
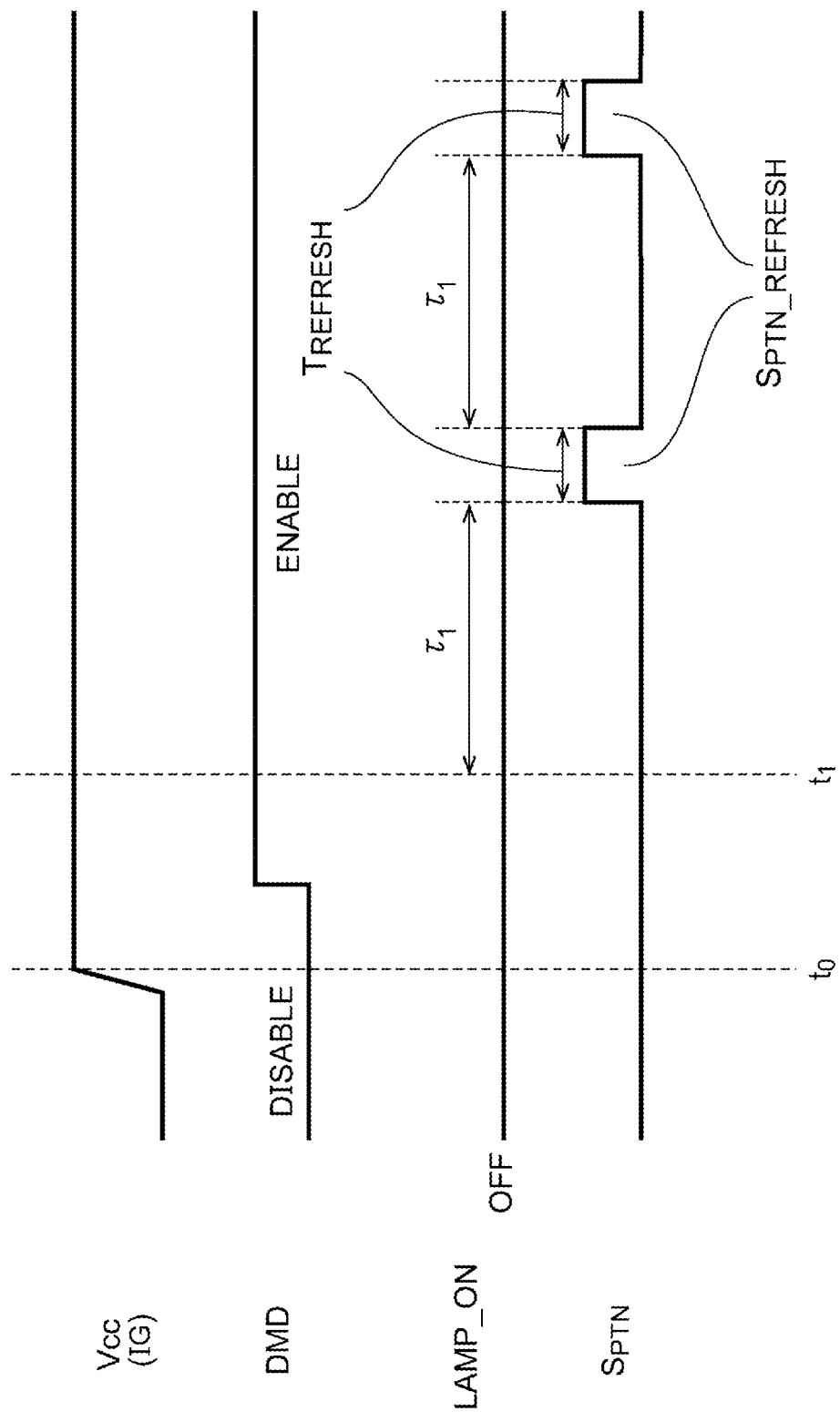
FIG. 8 is a diagram for explaining the refresh operation according to an example 3.

FIG. 8 is a diagram for explaining the refresh operation according to an example 3. The DMD controller 230 may insert the refresh period $T_{REFRESH}$ in a period in which the illumination light L1 is turned off after the end of the initialization period $T_{INIT}$. In this case, the refresh period $T_{REFRESH}$ may be inserted, for example, on the condition that the illumination light L1 is off (i.e., is in a turn-off period) for a predetermined judgment time (or intermittent period) $\tau_1$. Subsequently, the refresh period $T_{REFRESH}$ may be inserted every time the turn-off period continues for the judgment time $\tau_1$.

In the example 3, when the LAMP_ON signal is set to the high level, i.e., a turn-on instruction is input, in the refresh period $T_{REFRESH}$, the illumination apparatus 210 may turn on the illumination light L1 after the completion of the refresh period $T_{REFRESH}$.

Alternatively, with such a turn-on instruction as a trigger, the DMD controller 230 may immediately switch the refresh pattern signal $S_{PTN\_REFRESH}$ to the light distribution pattern signal $S_{PTN\_DIST}$, so as to end the refresh period $T_{REFRESH}$, and to instruct the illumination apparatus 210 to emit the illumination light L1.

As a result of investigation of hinge memory by the present inventors, it has been found that hinge memory is more likely to occur as the temperature of the DMD becomes higher. Specifically, when the temperature becomes higher than 70° C., the frequency of occurrence of hinge memory becomes higher. When the temperature becomes higher than 80° C., this tendency becomes marked. Accordingly, the temperature of the DMD (or the temperature in the vicinity of the DMD) may preferably be reflected in the refresh operation.

For example, in relation to the refresh operation in example 3 (FIG. 8), the judgment time $\tau_1$ may be reduced according to an increase in the temperature T so as to raise the frequency of the refresh operation. Conversely, when the temperature T is lower than a predetermined threshold value, and accordingly, when the probability of the occurrence of hinge memory becomes low, the refresh operation may be disabled. In this case, the threshold value may be set to 70° C. or less. The automotive lamp 200 may include a temperature sensor to be used for temperature measurement.

Also, with respect to the refresh operation described in examples 1 through 3, the refresh period $T_{REFRESH}$ may be increased according to an increase in the temperature T.

Also, multiple refresh pattern signals $S_{PTN\_REFRESH}$ may be prepared, and one from among the refresh pattern signals $S_{PTN\_REFRESH}$ thus prepared may be selected according to the temperature T.

Figure 9:
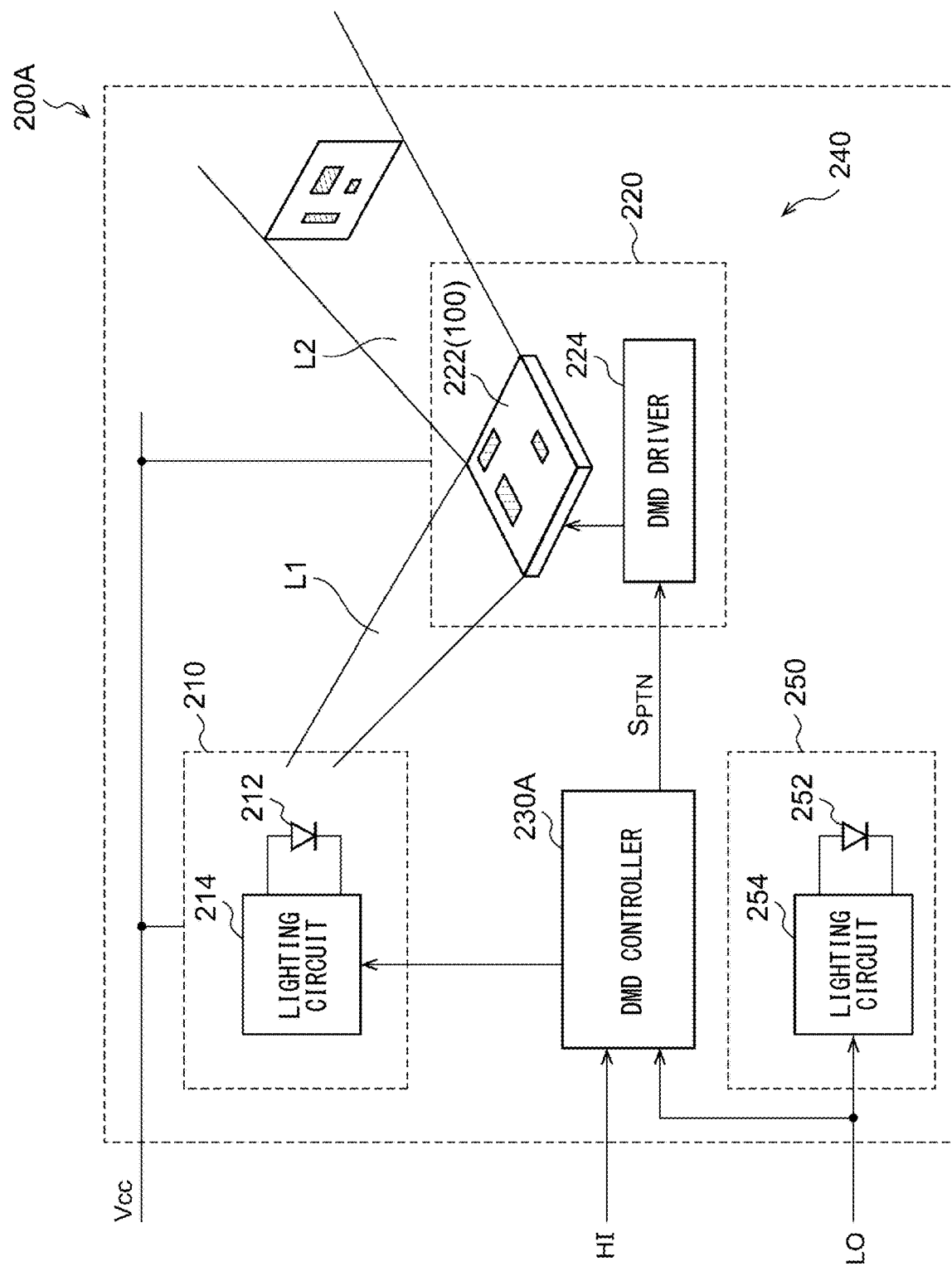
FIG. 9 is a block diagram showing an automotive lamp according to an example.

FIG. 9 is a block diagram showing an automotive lamp 200A according to an example. In the automotive lamp 200A, the illumination apparatus 210 and the patterning device 220 are configured as a high-beam lamp 240. The automotive lamp 200A includes a low-beam lamp 250 in addition to the high-beam lamp 240. The low-beam lamp 250 may include a semiconductor light source 252 and a lighting circuit 254 thereof. The automotive lamp 200A receives the input of a HI signal that is an instruction to turn on and off the high-beam lamp 240 and a LO signal that is an instruction to turn on and off the low-beam lamp 250. The turning on/off of the low-beam lamp 250 is directly controlled by the LO signal. A DMD controller 230A monitors the LO signal in addition to the HI signal.

When the low-beam lamp 250 is set to the turn-on state and the high-beam lamp 240 is set to the turn-off state, the DMD controller 230A may generate the refresh pattern signal $S_{PTN\_REFRESH}$. When the turn-on period of the low-beam lamp 250 continues, the temperature of the DMD 222 rises due to the occurrence of heat generation in the low-beam lamp 250. In this state, the micromirrors included in the DMD 222 are maintained in the off state, which causes hinge memory. In order to solve such a problem, the refresh period $T_{REFRESH}$ is inserted in the turn-on period of the low-beam lamp 250. In the refresh period $T_{REFRESH}$, the refresh operation is performed, which is capable of eliminating hinge memory. That is to say, it can be understood that the control operation shown in FIG. 8 is enabled on the condition that the low-beam lamp 250 is turned on.

It should be noted that, in a case in which the power supply voltage $V_{CC}$ to be supplied to the automotive lamp 200A is not controlled according to the turning on and off of the lamp, such an arrangement has the potential to involve a situation in which both the low-beam lamp 250 and the high-beam lamp 240 continue in a turned-off state while the DMD is enabled. In this case, in a case in which a given platform does not have the potential to involve the temperature of the DMD 222 rising to a temperature that causes hinge memory, the refresh operation may not be executed.

Conversely, in a case in which a given platform has the potential to involve the temperature of the DMD 222 rising to a temperature that causes hinge memory even in a state in which both the low-beam lamp 250 and the high-beam lamp 240 are turned off, the refresh operation may be executed. In this case, when the low-beam lamp 250 is turned on, the intermittent period $\tau_1$ shown in FIG. 8 may be shortened. Also, when the low-beam lamp 250 is turned off, the intermittent period $\tau_1$ shown in FIG. 8 may be lengthened.

Description has been made above regarding the present invention with reference to the embodiments. The above-described embodiments have been described for exemplary purposes only, and are by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

Modification 1

FIG. 10 is a diagram for explaining the refresh operation according to a modification 1. Description has been made in the examples 1 through 3 regarding an arrangement in which each micromirror is turned on and off on a short time scale of several frames to several hundred frames during the refresh period $T_{REFRESH}$. In contrast, in the modification 1, each micromirror is turned on and off on a longer time scale (several dozen seconds, several hundred seconds, or several hours).

Specifically, each micromirror may be intermittently turned on in a period in which the illumination light L1 is turned off in a state in which the DMD is enabled after the completion of the startup operation of the automotive lamp 200. For example, the DMD controller 230 may repeat an operation in which it generates a pattern signal $S_{PTN\_OFF}$ that is an instruction to turn off all the micromirrors during a predetermined off time $T_{OFF}$, and generates a pattern signal $S_{PTN\_ON}$ that is an instruction to turn on all the micromirrors during a predetermined on time $T_{ON}$. In this modification, a combination of the pattern signals $S_{PTN\_OFF}$ and $S_{PTN\_ON}$ corresponds to the refresh pattern signal $S_{PTN\_REFRESH}$.

Modification 2

Alternatively, the reciprocal on/off switching of each micromirror according to the refresh pattern signal $S_{PTN\_REFRESH}$ may be executed on a time scale that is shorter than the frame period $T_F$. As described above, the DMD 222 is capable of supporting multi-gradation control using pulse width modulation (PWM) control. Upon supplying an intermediate gradation value, the DMD driver 224 switches on and off each micromirror 104 with a duty ratio that corresponds to the gradation value thus supplied. Accordingly, the DMD controller 230 may generate the refresh pattern signal $S_{PTN\_REFRESH}$ including such an intermediate gradation value in the refresh period $T_{REFRESH}$, so as to turn on and off each micromirror using PWM control.

Modification 3

Description has been made in the embodiments regarding an arrangement in which the power supply of the automotive lamp 200 is supplied from the IG system. However, the present invention is not restricted to such an arrangement. For example, the power supply of the automotive lamp 200 may be supplied from a battery system (+B) that supplies the power supply at all times. In this case, the vehicle side may supply a standby signal as an additional signal that is an instruction to start and stop the automotive lamp 200. With such an arrangement, the start and stop operations of the automotive lamp 200 may be controlled according to the standby signal.

Modification 4

Description has been made in the embodiments regarding the headlamp. However, the present invention is not restricted to such an arrangement. Also, the present invention is applicable to an automotive lamp configured to draw various kinds of figures and characters on a road surface.

Modification 5

Description has been made in the embodiment regarding an arrangement in which the refresh operation is executed according to the refresh pattern signal $S_{PTN\_REFRESH}$ generated by the DMD controller. However, the implementation of the refresh operation is not restricted to such an arrangement. For example, a circuit configured to support the refresh operation may be built into the DMD driver 224. In this case, the DMD driver 224 may preferably be configured to receive the supply of a signal that is a notice that the illumination light L1 is turned off.

Description has been made regarding the present invention with reference to the embodiments using specific terms. However, the above-described embodiments show only an aspect of the mechanisms and applications of the present invention. Rather, various modifications and various changes in the layout can be made without departing from the spirit and scope of the present invention defined in appended claims.

The invention claimed is:

1. An automotive lamp comprising:
   an illumination apparatus structured to generate illumination light; and
   a patterning device comprising a digital micromirror device (DMD) structured to spatially modulate and reflect the illumination light according to a pattern signal,
   wherein the automotive lamp is structured to execute a refresh operation in which micromirrors of the DMD are repeatedly switched on and off while the illumination light is turned off and in a period in which the DMD is enabled.

2. The automotive lamp according to claim 1, wherein the refresh operation is executed in an initialization period immediately after a power supply of the automotive lamp is turned on.

3. The automotive lamp according to claim 1, wherein the refresh operation is executed when the power supply of the automotive lamp is shut down.

4. The automotive lamp according to claim 1, wherein the refresh operation is executed in a period in which the illumination light is turned off after the end of the initialization period.

5. The automotive lamp according to claim 1, wherein the illumination apparatus and the patterning device form a high-beam lamp,
   wherein the automotive lamp further comprises a low-beam lamp,
   and wherein the refresh operation is executed in a state in which the low-beam lamp is turned on and the high-beam lamp is turned off.

6. The automotive lamp according to claim 1, wherein, when a temperature of the DMD exceeds a predetermined value, the refresh operation is executed.

7. The automotive lamp according to claim 6, wherein a frequency of the refresh operation is increased according to an increase in the temperature of the DMD.

8. The automotive lamp according to claim 1, further comprising a DMD controller structured to generate the pattern signal,
   wherein the DMD controller generates a refresh pattern signal so as to repeatedly turn on and off the micromirrors, in a period in which the DMD is set to an enable state and the illumination light is turned off.

9. The automotive lamp according to claim 8, wherein the refresh pattern signal includes a plurality of consecutive frames,
   and wherein, in the plurality of frames, a luminance value is set to one from among zero and a maximum value for each pixel.

10. A control method for a digital micromirror device (DMD) mounted on an automotive lamp, wherein the control method comprises:
    irradiating illumination light to the DMD, and supplying a pattern signal to the DMD, in a period in which the automotive lamp is turned on; and
    supplying a refresh pattern signal for instructing the DMD to repeatedly turn on and off micromirrors of the DMD in a turn-off period in which no illumination light is irradiated.

\* \* \* \* \*